United States Patent
Lepere et al.

[11] Patent Number: 6,088,654
[45] Date of Patent: Jul. 11, 2000

[54] TERRAIN ANTI-COLLISION PROCESS AND DEVICE FOR AIRCRAFT, WITH IMPROVED DISPLAY

[75] Inventors: Gérard Lepere, Aubervilliers; Hugues Meunier, Les Essarts le Roi, both of France

[73] Assignee: Dassault Electronique, Saint Cloud, France

[21] Appl. No.: 09/222,366

[22] Filed: Dec. 29, 1998

[30] Foreign Application Priority Data

Jan. 12, 1998 [FR] France .................... 98 00297

[51] Int. Cl.⁷ .................... G01S 7/78; G06F 17/10
[52] U.S. Cl. .................... 701/301; 701/213; 342/29; 342/455; 342/958
[58] Field of Search .................... 701/301, 213; 342/29, 455, 958

[56] References Cited

U.S. PATENT DOCUMENTS 5,349,533  9/1994  Libby .................... 701/301
5,515,287  5/1996  Hakoyama et al. .................... 701/301
5,638,282  6/1997  Chazelle et al. .................... 701/301

FOREIGN PATENT DOCUMENTS

0381178 A1  8/1990  European Pat. Off.
2310184     8/1997  United Kingdom.

Primary Examiner—William A Cuchlinski, Jr.
Assistant Examiner—Olga Hernandez
Attorney, Agent, or Firm—Nixon & Vanderhye P.C.

[57] ABSTRACT

A device for aiding aerial navigation, carried on board an aircraft, receives on an input, status indications representing its spatial position and its velocity vector, and stores a 3D representation of the relief overflown. It comprises processing define, as a function of the status indications, an exploration sector referred to the aircraft, and calculate in this sector a contour as a function of the intersection of this sector with the relief, with a view to the displaying thereof. The sector is defined by a sheet of trajectory lines obtained on the basis of the velocity vector and of auxiliary vectors calculated by shifting the velocity vector of the aircraft according to a chosen angular scanning law.

51 Claims, 8 Drawing Sheets

TERRAIN ANTI-COLLISION PROCESS AND DEVICE FOR AIRCRAFT, WITH IMPROVED DISPLAY

FIELD OF THE INVENTION

The invention relates to the assisting of aerial navigation, especially when a risk of collision arises between an aircraft and the terrain which it is overflying.

PRIOR ART

As described in published EPC patent specifications EP-A-0 565 399 (corresponding to U.S. Pat. No. 5,488,563) and EP-A-0 802 469 corresponding to U.S. application Ser. No. 09/343,288, both of which are incorporated herein by reference, such forms of assistance comprise in particular means for detecting status information relating to the aircraft, such as its spatial position which may be relative (e.g. height above the terrain overflown) and/or absolute (e.g. height above a reference altitude, such as sea level), as well as its velocity vector and possibly its acceleration vector (which information will hereinafter be referred to without distinction as the dynamics of the aircraft).

Aboard an aircraft, the inertial module coupled with a so-called "Global Positioning System" or GPS system, associated with a Kalman filter, can provide certain items of this information (e.g. the speed and acceleration, and the latitude and longitude respectively). The other information can be obtained with the aid of so-called "baro-inertial" (absolute altitude) measurement means or of a radio altimeter (relative altitude).

However, the forms of assistance also comprise anti-collision devices intended to warn the pilot that a risk of collision with the ground (or terrain overflown) may arise. Such devices are in particular useful during approach prior to landing, as well as after take-off, because the aircraft is necessarily close to the ground.

Such devices are known as "Ground Proximity Warning Systems", GPWS for short, or "Ground Collision Avoidance System", GCAS for short.

In U.S. Pat. No. 5,488,563 and in French patent application No. 96 04678 (as well as in the specification of the corresponding application EP-0 802 469 also corresponding to U.S. application Ser. No. 09/343,288) the Applicants' assignees have described GCAS-type devices for aiding aerial navigation, comprising:

an input making it possible to receive status indications representative of the position and at least of the velocity vector of the aircraft, a work memory making it possible to store a three-dimensional representation of the relief of the region overflown by the aircraft, processing means capable of defining, as a function of the status indications, an exploration sector referred to the aircraft, and of calculating in this sector a contour as a function of the intersection of this sector with the relief, as well as means making it possible to display, in particular, the contour.

This type of aid device can also allow the pilot to display the estimated future trajectory of the aircraft and possibly the parameters of a standard trajectory relying on theoretical evasive manoeuvres for avoiding the terrain relief.

Interest has since been shown in generalizing these systems, and in their ergonomics. This in fact involves equipping a maximum number of civil aircraft, and providing the pilot with information which is as clear and easy to interpret as possible, since he may find himself in a situation which needs him to devote his attention elsewhere.

In one approach, it has been proposed to display the terrain relief in the form of horizontal level curves. Applicants consider that this is tricky to interpret, especially when the aircraft is moving in a non-horizontal plane, and/or in proximity to airport zones and undulating regions.

Moreover, in certain situations, the relief of the overflown terrain may be particularly undulating, and/or the aircraft may exhibit technical problems. The proposed evasive trajectory may prove to be impossible to implement because, for example, it intersects the terrain relief, and consequently gives rise to the issuing of an alarm, while the current trajectory which the aircraft is following is not at risk of intersecting the relief.

For the reasons mentioned above, as well as for other reasons which will be mentioned later, the present-day devices are therefore not entirely satisfactory.

OBJECT OF THE INVENTION

The object of the present invention is in particular to propose a GCAS-type device which is free from all or some of the aforementioned drawbacks.

SUMMARY OF THE INVENTION

To this end, a first aspect of the invention proposes a device for aiding aerial navigation of the type described above in relation to Applicants' assignees' GCAS disclosed in U.S. Pat. No. 5,488,563 and U.S. application Ser. No. 09/343,288, but in which the processing means are configured, first and foremost, so as to calculate auxiliary velocity vectors by shifting the (instantaneous) velocity vector of the aircraft according to a chosen angular scanning law, and then, so as to define the sector by a sheet of trajectory lines starting from the velocity vector and from the auxiliary velocity vectors.

Here, the expression auxiliary velocity vector is understood to mean a vector, two of whose three coordinates in a spherical reference frame referred to a centre of rotation representative of the position of the aircraft, namely the radius r and the angle $\theta$ with respect to the vertical, are unchanged with respect to those of the instantaneous velocity vector, whilst the angle $\phi$ of its projection in the horizontal plane is different from that of the velocity vector. Stated otherwise, to obtain angular scanning, the angle $\phi$ is made to vary on either side of the value which it possesses in respect of the velocity vector.

Thus, the pilot has available a contour (or map), which represents the relief in the direction of the velocity vector of the aircraft, and over a chosen angular sector. The word contour should be taken in the widest sense of the term, insofar as it represents all the lines of intersection which are displayed simultaneously and each of which separates two zones or regions. As will be seen later, it therefore denotes here both a terrain contour (also referred to as a map background or image background), and an alert contour.

Preferably, the angular scan is performed over a sweep of between 1 and 360°, and more preferably between 60° and 120°.

In a preferred embodiment, the trajectory lines all have the same geometry. They may in particular be straight or curved. They may in particular be replicas of an estimated future trajectory of the aircraft, deduced from the current trajectory; (they are then said to be "at unchanged piloting control input").

In order to improve the accuracy of the contour, the processing means can be configured in such a way as to define several sheets of trajectory lines having different vertical shifts, preferably spaced apart at the outset in a substantially regular manner. For example, the sheets may be at least partially substantially parallel to one another. This makes it possible to "probe" the relief over considerable heights (or layers).

However, the trajectory lines can also be formed from (first) estimated evasive (or avoidance) trajectory lines relying on manoeuvres; (they are then said to be "at piloting control inputs modified according to a first chosen evasive law").

This may for example be the evasive trajectory known to those skilled in the art by the name of "caution", which is obtained via a first evasive law comprising an extension of a representation of the current trajectory established as a function of a chosen criterion, followed by a manoeuvre having a vertical component. Under this assumption, the processing means may be constructed in such a way as to make it possible, when at least one of the first estimated evasive trajectories intersects the relief, to calculate the contour as a function of the start point of each manoeuvre in each first estimated evasive trajectory line of the said sheet.

The pilot then has available a contour which may be dubbed the first alert contour (or pre-alarm contour) which may, if relevant, be displayed at the same time as a contour obtained with the aid of the estimated future trajectories, or else separately therefrom. Such a first alert contour provides the pilot with information about the distance which separates his aircraft from the relief in the "direction" of the first proposed evasive trajectory.

The trajectory lines may also be second estimated evasive (or avoidance) trajectory lines, at piloting control inputs modified according to a second chosen evasive law, starting from the velocity vector and from the auxiliary vectors. It may for example be the evasive trajectory known to those skilled in the art by the name of "warning", which is obtained via a second evasive law comprising an extension of a representation of the current trajectory established as a function of a chosen criterion, followed by a manoeuvre having a vertical component. Under this assumption, the processing means may be constructed in such a way as to make it possible, when at least one of the second estimated evasive trajectories intersects the relief, to calculate the contour as a function of the start point of each manoeuvre in each second estimated evasive trajectory line of the said sheet.

The pilot then has available a contour which may be dubbed the second alert contour (or alarm contour) which may, if relevant, be displayed at the same time as the first alert contour and as the contour obtained with the aid of the estimated future trajectories, or else separately from one or other of them. Such a second alert contour provides the pilot with information about the distance which separates his aircraft from the terrain relief in the "direction" of the second proposed evasive trajectory.

Preferably, each intersection between the relief and a sheet of evasive trajectories is limited to an upstream part, each contour then consisting of this upstream part and of a downstream extension determined according to a chosen rule, for example a linear extension.

Here, the expression upstream part is understood to mean the zone or region situated between a portion of contour and the aircraft, and downstream part that situated beyond this portion of contour.

According to another characteristic of the invention, the processing means comprise means of differentiation able to allocate different markings to the zones which are situated on either side of each part of the contour, these markings being chosen as a function of a predetermined criterion pertaining to a risk of collision between the aircraft and the relief.

For example, the predetermined criterion may be a law pertaining to the distance separating each point of the contour from the point representative of the relief situated vertically plumb with the contour point, the different markings then corresponding to different, predetermined vertical distance intervals representative of associated risks of collision.

Preferably, each marking consists of a coloration whose various colours are chosen from among a family of standards comprising at least the European Standard JAR 25-1322 and the American Standard FAR 25-1322, the coldest colour corresponding to the smallest risk of collision. It will for example be possible to choose as colours, in descending order of risk of collision: red, orange, yellow, green and blue.

Of course, it will be possible to choose as markings, shades of grey ranging from white to black, or else hatching (or rasters) of different varieties.

According to yet another characteristic of the invention, the processing means are configured so as to control the alternate displaying of the contour and of a weather map. Of course, provision may be made for the displaying of the contour and of a weather map to be simultaneous. Provision may be also made for complementary information, especially of the airport location type, to be displayed simultaneously with the contour.

According to yet another characteristic of the invention, the processing means are configured so as to trigger a chosen audible or visual pre-alarm in the event of intersection between a sheet formed of first evasive trajectory lines. Provision may also be made for an audible and/or visual alarm to be triggered in the event of intersection between a sheet formed of second evasive trajectory lines. Of course, provision may be made for just one or other of the alarm and pre-alarm, or else both. These will for example be able automatically to trigger the displaying of the contour.

According to yet another characteristic of the invention, it is possible to provide for a "terrain avoidance" procedure comprising at least one horizontal component. To do this, the processing means may be configured in such a way as to issue another alarm, visual and/or audible, when the intersection satisfies a chosen criterion, between, on the one hand, the relief and one at least of the first and second evasive trajectories, and on the other hand, the relief and at least the estimated future trajectory.

This chosen criterion may, for example, pertain at least to the vertical distance which separates the representation of the intersection between the terrain relief and the evasive trajectory and the apex of the relief substantially square with the intersection between this relief and the relevant evasive trajectory.

Preferably, the processing means are capable of defining a domain encompassing each trajectory line constituting a sheet, as a function of the status indications and of the relief, as well as of determining the intersection between each sheet and the relief on the basis of the intersections of the domains of each of its trajectory lines with the said relief. Such trajectory lines are then called "probe" lines. They make it possible to take account of the uncertainties in measurements of the position and dynamics of the aircraft.

In this case, the point of intersection of a trajectory line contributing to the formation of the contour is obtained, preferably, by taking the point of intersection, from among all the points of intersection between the domain of this trajectory line and the relief, which possesses the highest altitude.

According to yet another characteristic of the invention, the input of the device can receive status indications, and in particular an actual altitude and a relative altitude referenced with respect to the overflown terrain, and the processing means are configured so as to determine the estimated (future) trajectories and evasive (or avoidance) trajectories on the basis of an altitude chosen from among the actual and relative altitudes and a composite altitude as a function of a comparison with two predetermined altitude thresholds, the said chosen altitude being:

either the actual altitude when the said actual altitude is less than the two thresholds, or the relative altitude when the said actual altitude is greater than the two thresholds, or the composite altitude when the said actual altitude lies between the two thresholds, this composite preferably being formed from a weighted combination of the relative and actual altitudes.

This makes it possible to enhance the reliability of the results (contour).

In a preferred embodiment of the invention, the device comprises a mass memory for allowing the storage of a database representing at least a part of the terrestrial globe, as well as management means able to extract from this database the three-dimensional representations of the relief (also referred to as temporary local maps) as a function of the aircraft's position parameters, so as to place them in the work memory in tandem with the motion of the aircraft. This makes it possible to render the device autonomous.

A second aspect of the invention proposes a process for aiding the aerial navigation of an aircraft, comprising the following known steps:

a) receiving, on board the aircraft, status indications representing its position and its velocity vector, b) storing in a work memory a three-dimensional representation of the relief of the terrain overflown by the aircraft, c) defining, as a function of the said status indications, an exploration sector referred to the aircraft, and calculating in this sector a contour as a function of the intersection of this sector with the relief, and d) displaying the said contour, the process being noteworthy in that its step c) comprises the following sub-steps:

c1) calculating auxiliary velocity vectors by shifting the velocity vector of the aircraft according to a chosen angular scanning law, and c2) defining the said sector by a sheet of trajectory lines starting from the velocity vector and from the auxiliary velocity vectors.

BRIEF DESCRIPTION OF THE DRAWINGS

Other objects and advantages of the invention will emerge from examining the detailed description below, and the appended drawings in which.

DETAILED DESCRIPTION OF THE PREFERRED EMBODIMENTS

The appended drawings are essentially of definite character. Accordingly, they shall not only make it possible to better elucidate the detailed description which follows, but also to contribute to the definition of the invention, as the case may be.

Furthermore, and having regard to the technical nature of the subject, the descriptive contents of U.S. Pat. No. 5,488,563 and U.S. application Ser. No. 09/343,288 are incorporated herein by reference in their entirety. The same is true in respect of the following document:

DASSAULT ELECTRONIQUE paper No. 810-196 AN, distributed publicly in October 1997, entitled "A New Approach to CFIT Prevention and to improve situational awareness: GCAS GROUND COLLISION AVOIDANCE SYSTEM".

The standard messages used in civil aviation are expressed in English. Among them, mention may be made of the following terms which define the risk of collision with the ground:

"advisory", which corresponds to an indication or else advice,

"caution", which is referred to herein as pre-alarm, and which is of a cautionary nature, "warning", which is referred to herein as alarm, and which is of an emergency nature.

Separately or together, these various levels of message are referred to as "alerts". For ease of description, there will be no discussion of the "advisory" alerts or advice which may be regarded for example as an advance version of the pre-alarms.

Also, use will be made of units which do not belong to the MKSA system, although they are derived therefrom, in so far as they are employed in civil aeronautics.

Figure 1:
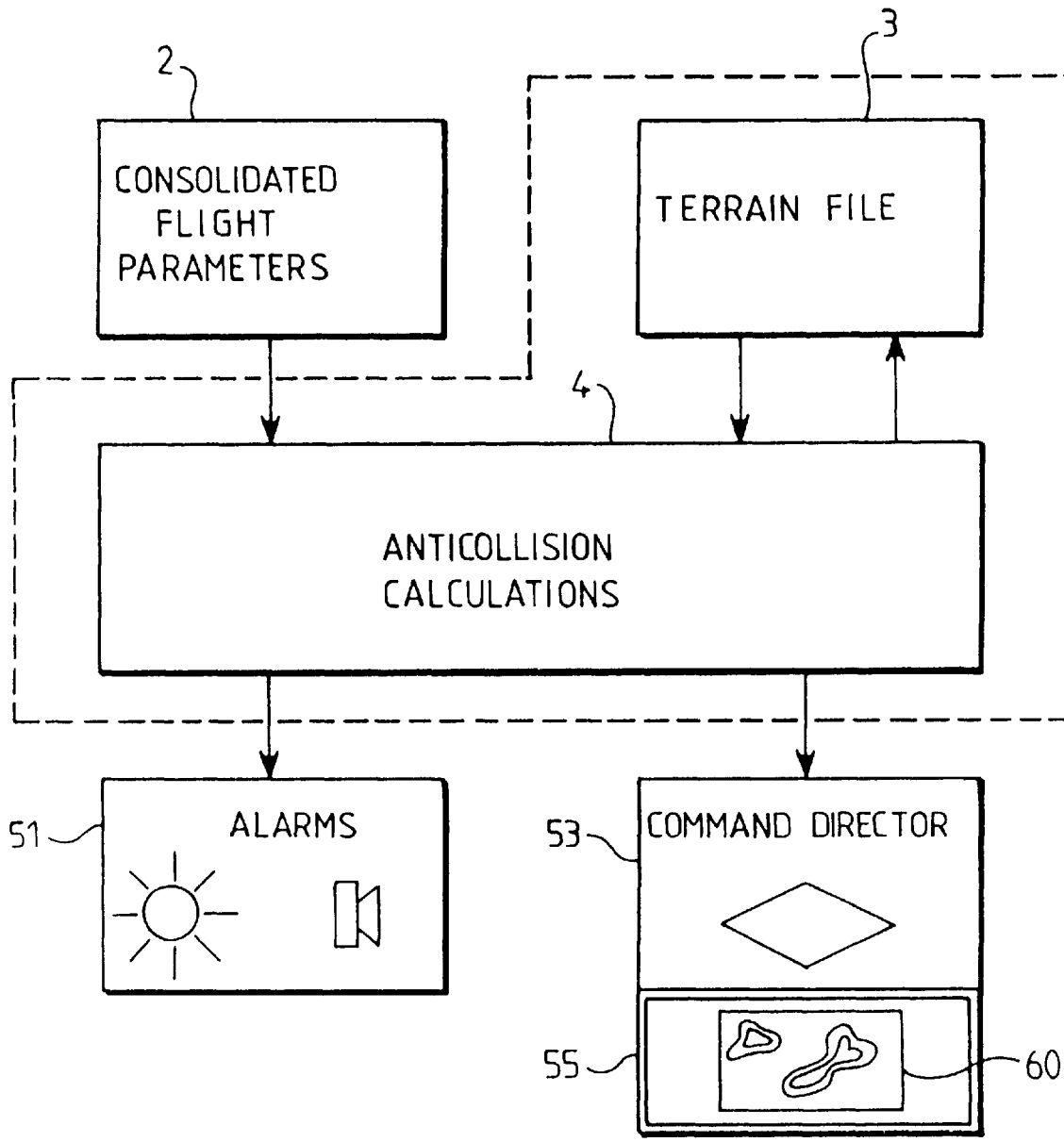
FIG. 1 is a very general basic diagram of a prior art GCAS device for aiding aerial navigation, such as those described in U.S. Pat. No. 5,488,563 and U.S. application Ser. No. 09/343,288.
Figure 2:
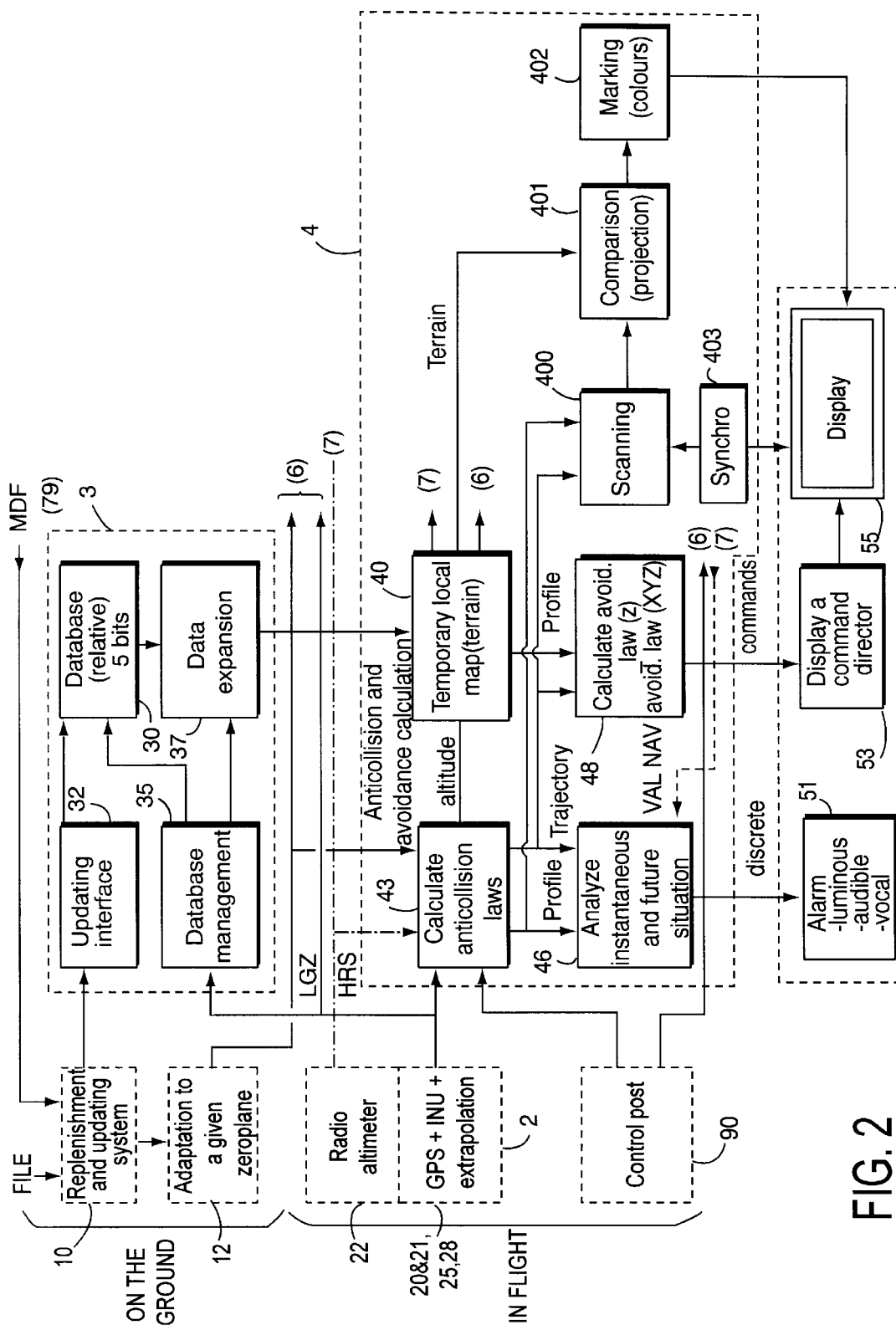
FIG. 2 is a detailed diagram of an embodiment of a device according to the invention.

Reference will be made firstly to FIGS. 1 and 2 to describe a first non-limiting embodiment of a device for aiding aerial navigation according to the invention.

The device described in U.S. Pat. No. 5,488,563 is essentially intended to be installed on board an aircraft, and especially an aeroplane. The device includes equipment 2 capable of providing, in the form of electrical signals, indications of flight parameters (position and dynamics, in particular), such as an inertial or baro-inertial module 20 or INU, and/or a radionavigation instrument, here a GPS receiver 21 (but it could be an IRS) with its antenna, a radio altimeter 22, with its antenna, or other on-board navigation sensors.

The inertial module 20 delivers the component vectors of the velocity (V) and acceleration (GAMMA) vectors of the aircraft. From this can be deduced all or some of the associated characteristic angles (incidence, yaw, gradient, pitch, heading, roll, in particular), or gather directly the values of these angles used internally by the inertial module. These angular values may be displayed and/or used at command post level. In the case of the altitude, the inertial module cooperates with a barometric altimeter (not represented), in a known manner.

The following notation will be defined:

Zb is the barometric altitude given by measuring the atmospheric pressure, and varies according to altitude and weather conditions, Zi is the inertial altitude calculated by twice integrating the vertical acceleration measured by the accelerometers of the inertia module (long-term variations), Zbi is the baro-inertial altitude, that is to say Zb filtered by Zi (3rd order loop, for example), Zc will be the calculated altitude (HRS+Zta), where HRS is the radio-probe height (or relative altitude) given by the radio altimeter(s) of the aircraft (accuracy of a few metres), and Zta will be the altitude of the terrain beneath the aircraft given by the terrain file (defined further on), and Zgps is the altitude delivered by the GPS, for example.

The GPS receiver 21 delivers raw measurements of latitude L1, longitude G1, and altitude Z1 (=Zgps), refreshed at a rate p1 of from a few seconds to a few minutes. By integrating the velocity and acceleration vectors, the inertial module 20 delivers other measurements of latitude L0, longitude G0, and altitude Z0 (=Zbi), which are accurate but drift over time. A block 25 compares the two types of measurement, and validates the magnitudes L1, G1, Z1, if they are consistent with L0, G0, Z0. Such validation techniques are known. The validated measurements L2, G2, Z2 are available at the rate p1. However, they are refined from the inertial module at a rate p2 of around 1 second.

A block 28 extrapolates the information between the latest instant of measurement by the instrument 21 and the current instant (this extrapolation is useful in particular in the event of a problem with the rate of provision of information which may be too low). The radio altimeter 22 delivers the height above ground, denoted HRS.

Figure 4:
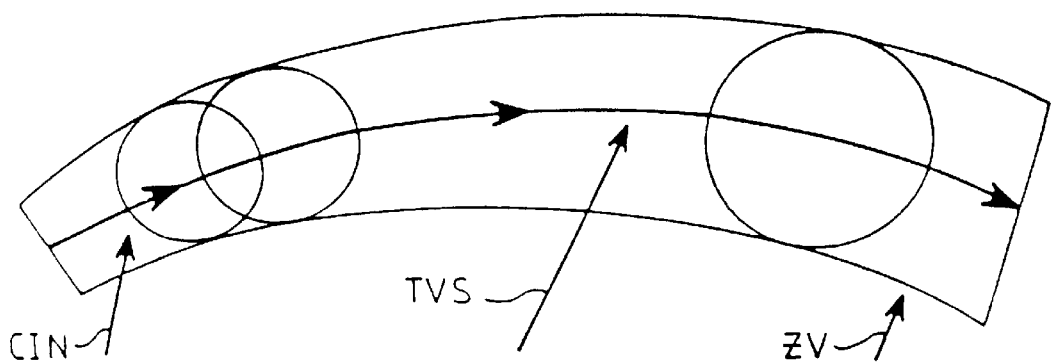
FIG. 4 illustrates the uncertainty related to the estimated trajectory of an aircraft, projected into the horizontal plane.

A block 3 contains a terrain file, established in a manner which will be described below. As a function of the magnitudes L and G, a part of this file, called the local map, which is a three-dimensional representation of the relief of the region overflown by the aircraft, stored in a local memory 40 (FIG. 4A) is accessed.

On the basis of this local map, and of the magnitudes L, G, Z as well as HRS, the block 4 carries out anti-collision calculations, preferably accompanied by terrain avoidance calculations.

When a risk of collision is present, an alarm (51) is issued. A command director 53 may suggest an avoidance manoeuvre. This is intended for the control (or piloting) post. The local map can also be used to generate an artificial image (60), with its display device 55.

All of this is described in U.S. Pat. No. 5,488,563 and U.S. application Ser. No. 09/343,228 which also indicate how to approximate and cross-check the various information available, especially in vertical mode.

One of the essential basics of EP-A-0 565 399 is the fact that he Applicants have perceived the possibility of storing aboard an aircraft terrain file which can represent almost the whole of the terrestrial block, within the contour and resolution limit which is appropriate for the needs of an aircraft.

The analysis of the instantaneous and predicted situation of the aircraft can then be summarized into a set of tests of curves, which is able to generate in principle two types of alarms at least:

a pre-alarm indicating a medium-term dangerous configuration, and an alarm indicating a configuration requiring immediate action from the pilot, since the safety of the flight is jeopardized.

To this end, two surfaces (curves in space) for protecting the aircraft in relation to the terrain are provided, defined according to the same principle but with different parameters, and comprising:

a short-term surface CCT, mainly intended for avoiding an undulation. As soon as a point of the terrain enters the surface or the upper envelope of the CCT surface, the pilot must intervene (alarm) by performing an avoidance manoeuvre;

a medium-term surface CMT, mainly intended to forewarn the pilot that the trajectory of his aircraft will encounter an obstacle if it is continued unaltered, and that he should contemplate an avoidance manoeuvre (prealarm).

These surfaces, which constitute an important element of the protection system, can be computed from numerous static and dynamic parameters of the aircraft, in particular:

the aircraft's piloting transfer function, that is to say its capacity to manoeuvre, the delays $TR_o$ due to the reaction time of the pilot of the aircraft, the horizontal speed $V_h$ of the aircraft, the upward speed $V_z$ of the aircraft, the allowable load factor (n.g) of the aircraft in manoeuvre, the scheduled safety height, and the roll of the aircraft.

In the ensuing description, a few definitions are necessary:

the expression "instantaneous axis" of the trajectory of the aircraft refers, in a predefined manner, either to the tangent to the instantaneous trajectory (direction of the instantaneous velocity vector), or to the axis of the past and predicted trajectory (if the aircraft is turning, the "axis" is then curved), or else to an axis (in principle intermediate) defined, for example, by a weighted linear combination of the above two;

the expression "vertical plane" refers to a surface (not necessarily plane) which contains the vertical passing through the aircraft and an instantaneous axis of the trajectory of the aircraft; being the axis of the past and predicted trajectory, the "vertical plane" is a curved surface if the aircraft is turning; the term "vertical" describes manoeuvres whose main component is in a vertical plane;

the expression "horizontal plane" refers to the horizontal plane passing through a reference point of the aircraft (centre of gravity for example) and the terms "horizontal" or "lateral" describe manoeuvres whose main component is in a horizontal plane; here again, the horizontal "plane" could be a curved surface in space, defined according to the trajectory of the aircraft;

among the horizontal manoeuvres, a distinction is made between those which go to the left and those which go to the right of the predicted trajectory of the aircraft;

finally, the words "vertical" and "horizontal" or "lateral" will also be used to describe in particular the obstacles and risks which may be encountered during manoeuvres.

The avoidance (or evasive) limit curve in the vertical plane can be defined by three spans:

from $T_0$ to $T_1$, the continuance of the trajectory as is (without manoeuvre) for a time equal to the delay $RT0=T_1-T_0$ (corresponding to a reaction time), from $T_1$ to $T_2$, a period of transition due to a possible reduction in roll and to the changing of the radius of curvature of the trajectory from infinity to the upward radius $R_T$, from $T_2$ to $T_3$, the avoidance trajectory proper, whose radius of curvature $R_T$ is a direct function of the square of the linear velocity of the aircraft, divided by the load factor actually applied, i.e.

$$R_T=(V_h)^2/n.g$$

Figure 6:
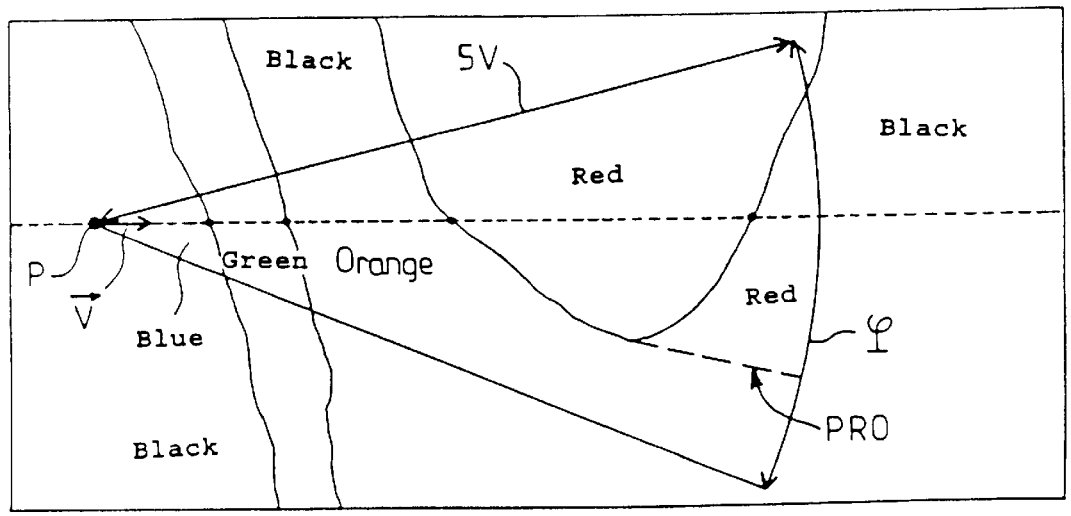
FIG. 6 illustrates the risk-of-collision map formed from a multiplicity of sections of the type in FIG. 5, and corresponding to a scan cycle.

The foregoing has, in essence, been indicated in FIG. 6 of U.S. Pat. No. 5,488,563. Nowadays, it is considered to be desirable to add a fourth span to the limit curve:

beyond T3, a straight line whose slope is related to the characteristics (performance) of the aircraft.

Figure 8A:
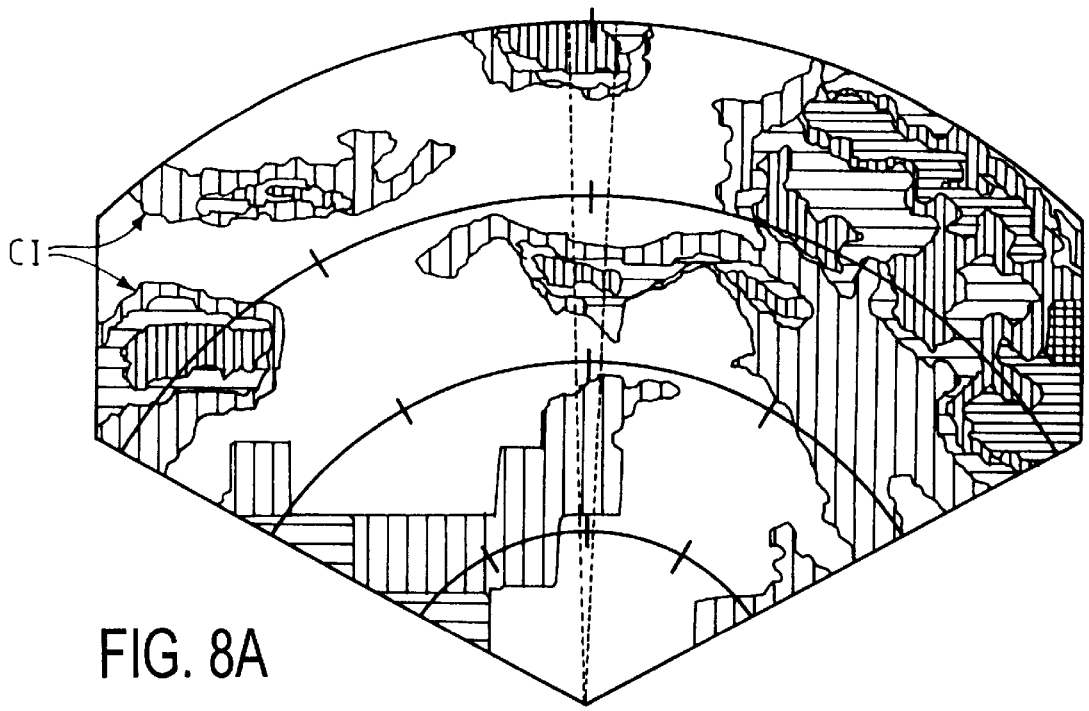
FIGS. 8A to 8D illustrate various displays that may be obtained according to the second embodiment of the invention.
Figure 8B:
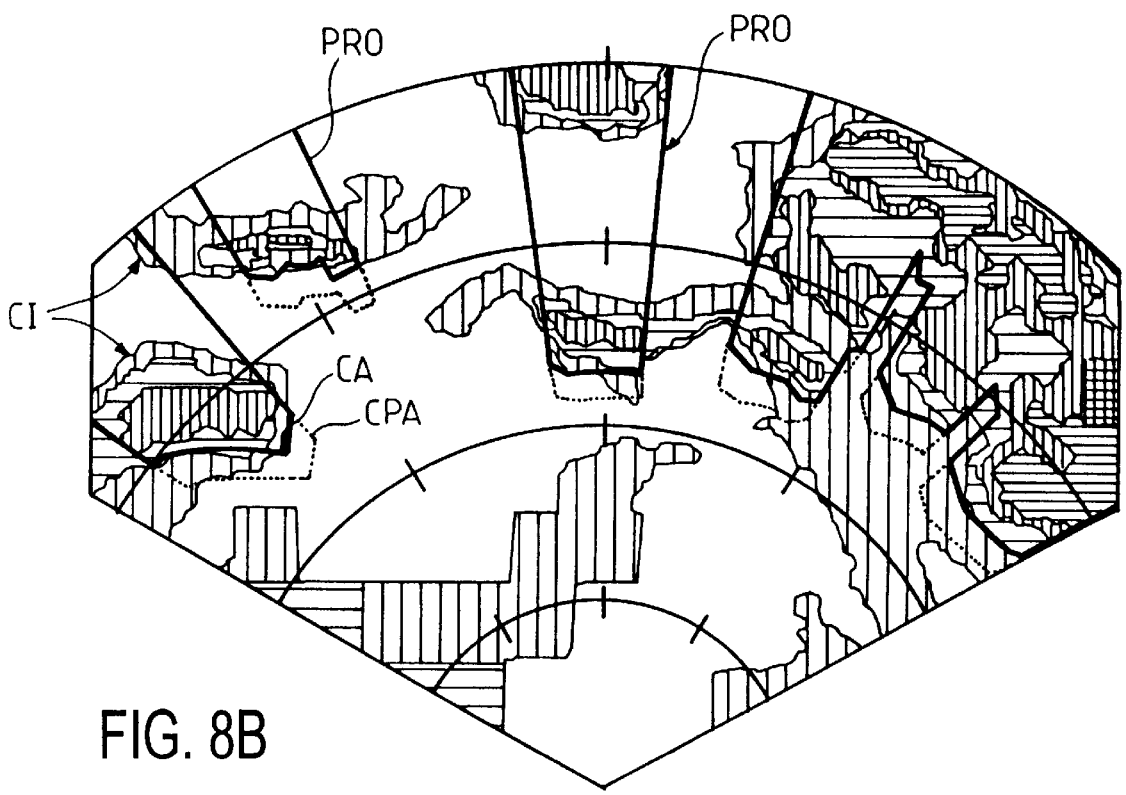
Figure 8C:
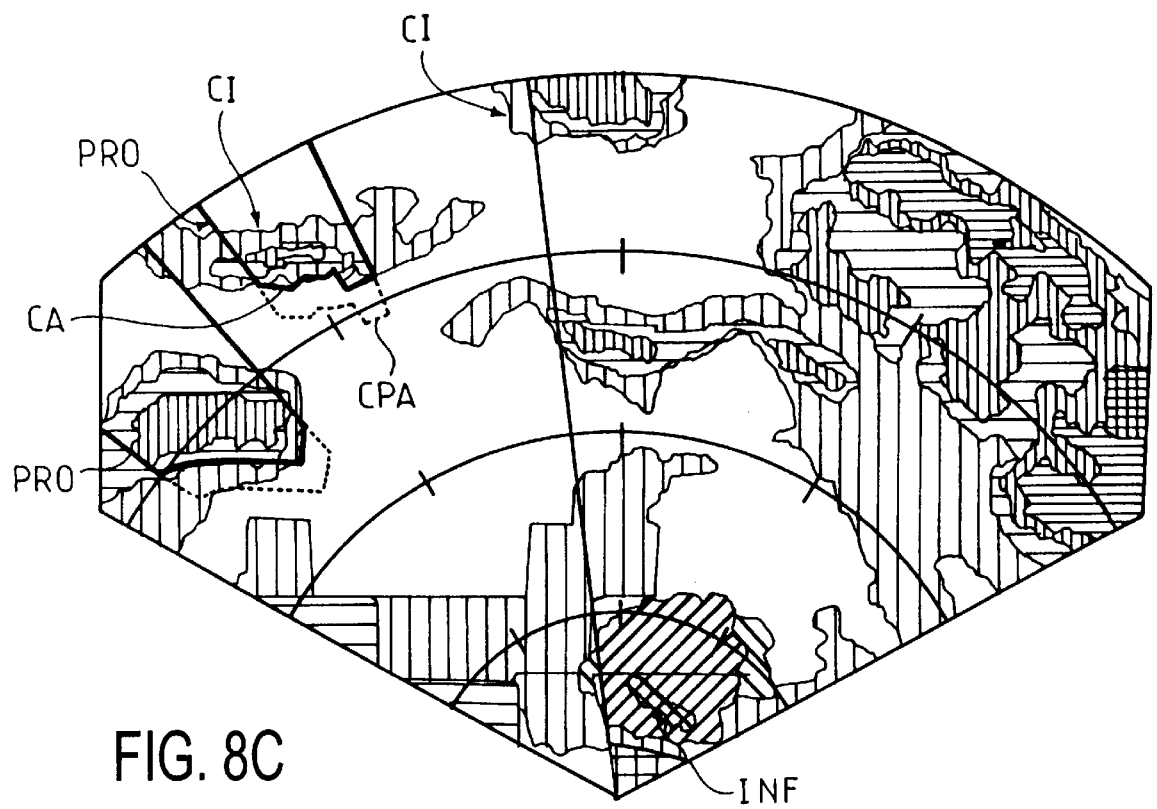
Figure 8D:
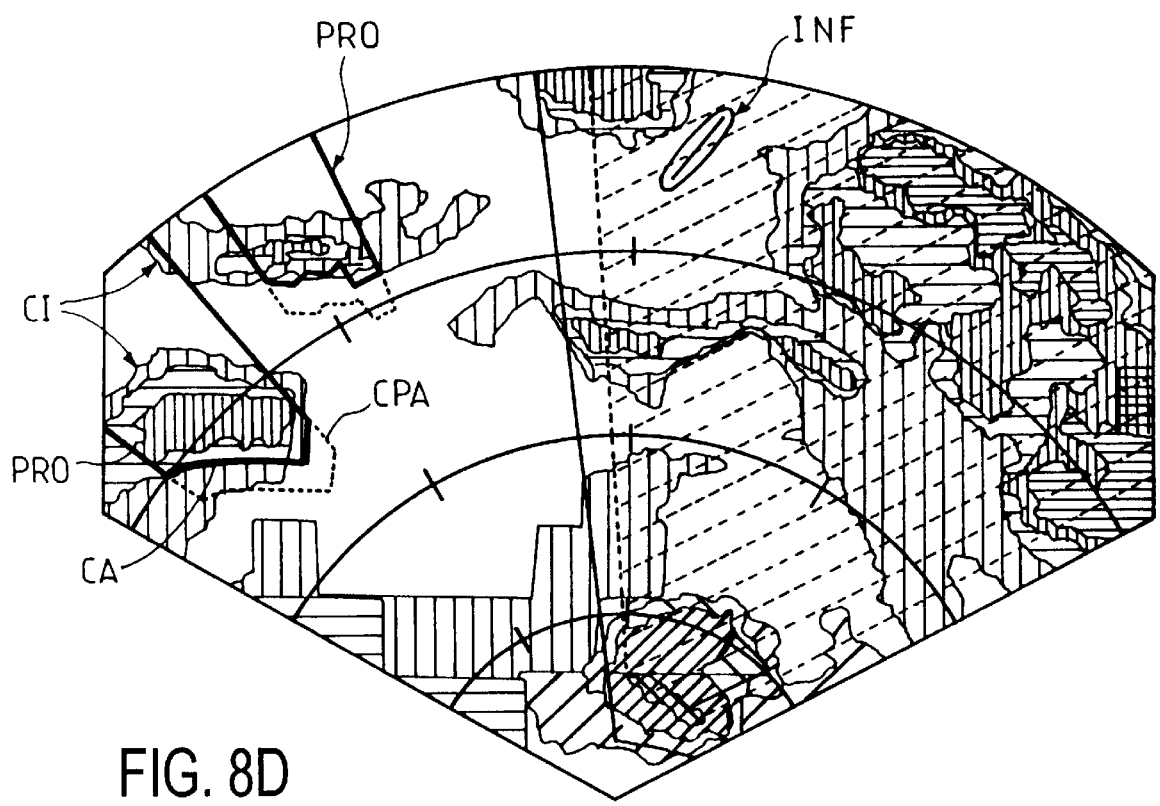

In practice, the "avoidance limit curve" is a surface in space, referred to as a "probe". For digital processing, this surface is sampled as a family of curvilinear segments: see in particular the text and FIGS. 8A and 8B of U.S. application Ser. No. 09/343,288, for fuller information.

Thus:

defined firstly is a trajectory corresponding to a standard avoidance manoeuvre in the vertical plane SVRM (Standard Vertical Recovery Manoeuvre);

by taking the instantaneous axis of the trajectory of the aircraft and/or according to the orientation of the predicted trajectory (or their linear combinations), the SVRM can be made to slide along this axis to the point at which it meets the envelope of the terrain;

it is then possible to define a vertical reference point or time VRP (Vertical Referent Point), which is the beginning of the SVRM;

upstream of this point VRP on the predicted trajectory, two times VT5 and VT20 are defined, with for example VT5=VRP-5 seconds, and VT20=VRP-20 seconds;

a "vertical" pre-alarm and alarm are then defined, respectively as soon as the aircraft passes the point VT20, and as soon as it passes the point VT5 (naturally, the alarm "overrides" the pre-alarm).

The technical means just defined are satisfactory in most situations encountered in practice.

Briefly, they make it possible to provide the pilot(s) of the aircraft with a "pull up" alarm signal if the predicted trajectory suggests a definite risk in relation to the neighbouring terrain overflown, so that the pilot can initiate, as a matter of emergency, a manoeuvre for avoiding this terrain with a minimum safety margin. The concept of minimum safety margin is understood both in terms of human reaction time and in terms of distance relative to the terrain avoided. The expression "neighbouring terrain overflown" takes account not only of the terrain encountered directly along the axis of the trajectory of the aircraft, but also of its neighbouring parts.

With this alarm signal there is associated a pre-signal (pre-alarm), which intervenes a few seconds earlier, so as to forewarn the crew of the proximity of this potential risk. However, there are cases in which it is normal for the aircraft to go past the final point to perform the standard avoidance manoeuvre. Now, beyond this point, a "vertical" avoidance manoeuvre is no longer possible.

The invention starts with the generating of "trajectory lines".

A trajectory line is established on the basis of an estimated or predicted trajectory of the aeroplane, calculated on the basis of its current position and current dynamics. The estimated trajectory can be calculated without changing the piloting controls, or alternatively with such a change, that is to say with a manoeuvre which will modify the dynamics of the aircraft.

It is important to understand that a trajectory line is not necessarily a real future trajectory of the aeroplane. It may be shifted in space, positionally and directionally, as will be seen later.

Figure 3:
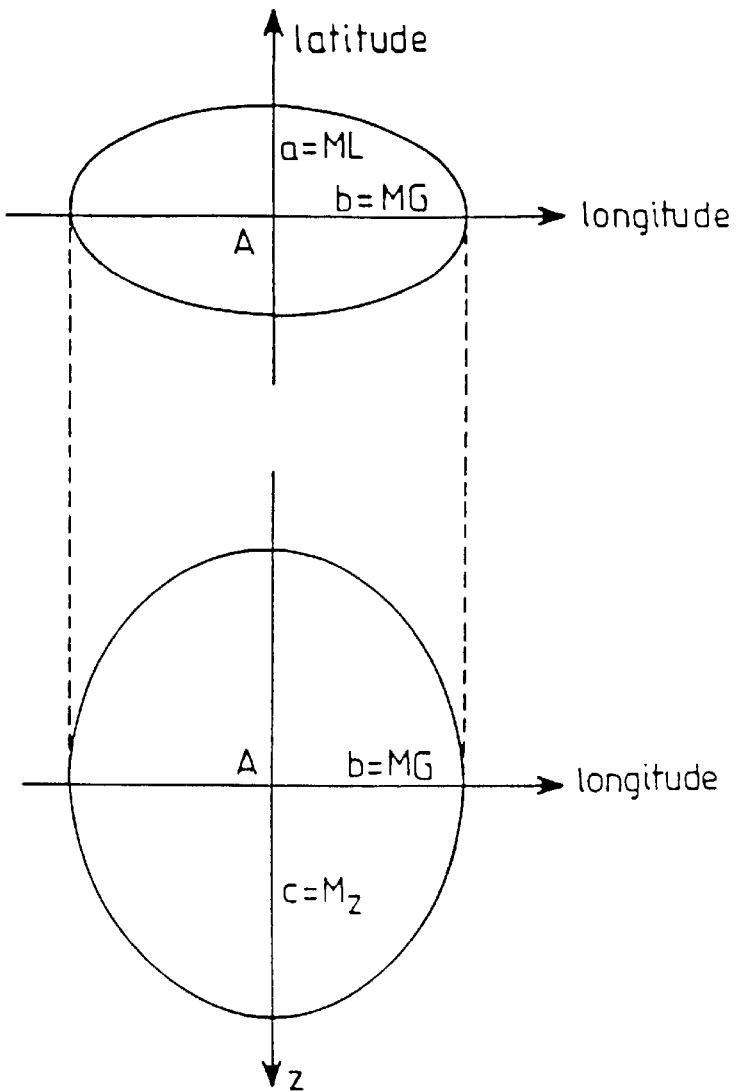
FIG. 3 illustrates a domain of uncertainty regarding the position of an aircraft.

Lastly, at least in respect of the trajectory lines which are actually future trajectories of the aeroplane, a domain (FIGS. 3 and 4) which takes into account various uncertainty margins, especially those described in U.S. Pat. No. 5,488, 563 and/or U.S application Ser. No. 09/343,288, may be provided for round the line.

The calculations required to implement the invention, especially to calculate the trajectory lines, may be conducted with a microcomputer of the POWER PC 603 type, with the aid of programs written, for example, in the C language such as C.ANSI, if relevant with the assistance of a DSP-type supporting processor.

Firstly, the general principle of the invention will be described with reference to FIGS. 5 and 6 which illustrate a first embodiment.

Figure 5:
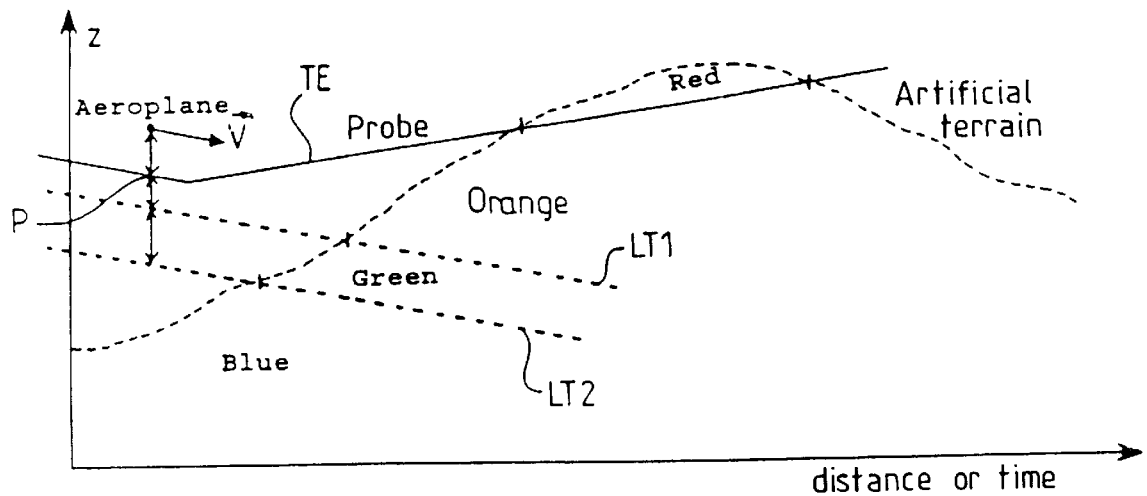
FIG. 5 is a vertical sectional view illustrating in one situation the basics of a first embodiment of the invention, the position of an aircraft in relation to the relief depicted, at a given instance, as well as the three director lines representative of an avoidance trajectory and of parallel estimated trajectories, respectively.

In FIG. 5 may be seen a standard avoidance limit trajectory TE (Standard Horizontal or Vertical Recovery Manoeuvre), which, starting from the present position of the aeroplane P, continues with a brief continuance of the current trajectory, then with a climb, forming a chosen vertical angle with respect to the current trajectory, this being referred to as a "probe".

The "artificial terrain" emanating from the database is illustrated here by narrowly-spaced dashes.

Also represented under the aeroplane are two trajectory lines LT1 and LT2, which here are parallel to the present trajectory of the aeroplane (and also to its past trajectory, since here the aeroplane is assumed to be flying in a straight line).

FIGS. 5 and 6 will make it possible to portray colour concepts which cannot be given in the illustrations which follow and will be replaced by hatching.

A display sector SV is portrayed in FIG. 6. It starts here from a vertex representative of the present position P of the aeroplane, FIG. 6 being a projection on a horizontal plane.

The terrain is defined as level curves, but these are established perpendicularly to the planes which satisfy the following two conditions:

in each case they pass through the relevant trajectory line LT1 or LT2, they are perpendicular to the plane of FIG. 5 (this perpendicularity holds only for flight in a straight line).

The terrain can then be displayed as illustrated in FIG. 6, with blue for the lowest parts, located under the line LT2, green for the terrain parts lying between the trajectory lines LT1 and LT2, orange for the part of the terrain situated above the trajectory line LT1. Preferably, outside the display sector SV the only colour used is black.

These intersections with the planes define contour portions which form a "map background" or an "image background".

Furthermore, for the alert operation proper, consideration is given to the intersection of the avoidance trajectory TE with the terrain which, here, occurs. The "significant" terrain parts situated above this curve TE are illustrated in red in FIG. 6.

It will be understood that the correspondence between FIG. 5 and FIG. 6 holds only for the horizontal dashed line given in FIG. 6, the rest is deduced therefrom in a manner which those skilled in the art will understand. The complete contour displayed in FIG. 6 represents the result of a cycle of angular scanning over an exploration sector, here the sector extends over about 30°, but it can lie between about 1° and about 360°, if necessary. Moreover, the dashed line PRO of FIG. 6 represents the "linear" downstream extension of the upstream contour portion. More will be said later regarding this extension, in the part referring in particular to FIGS. 8.

The invention can be implemented in various ways. This is true in particular as regards the monitored trajectories.

Figure 11:
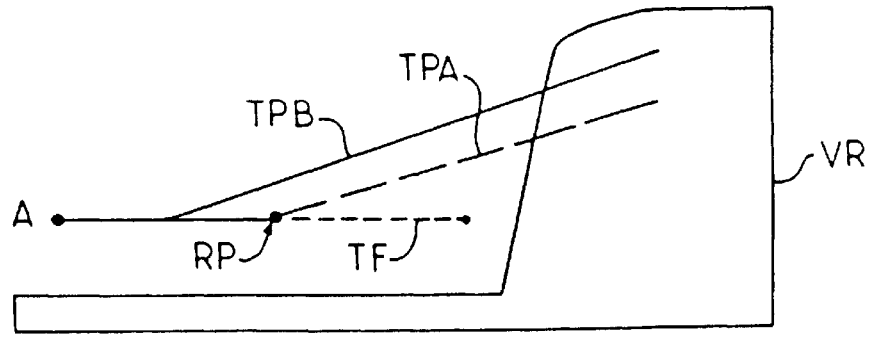
FIG. 11 illustrates very diagrammatically various volumes in front of an aircraft, and especially in a particular case in which a false alarm may arise if the processing is not disabled.
Figure 11:
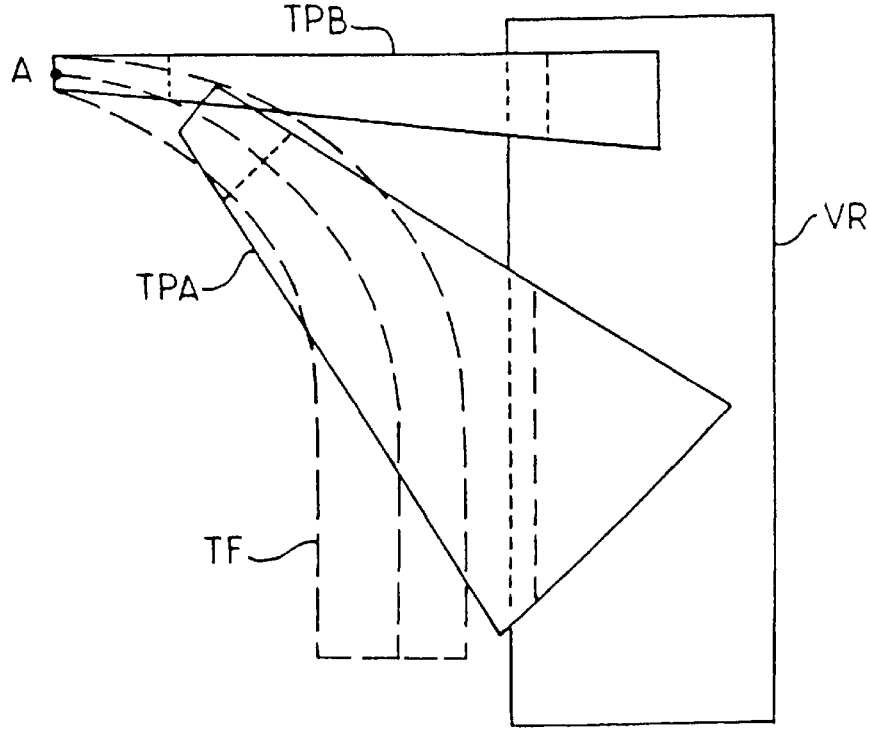

The alarm generation algorithms are implemented by taking account jointly of the risks of collision of the aircraft with the relief VR according to the following predicted trajectories (FIG. 11):

future trajectory of the aircraft (denoted TF), avoidance trajectory for pre-alarm ("probe A" denoted TPA), avoidance trajectory for the alarm ("warning") according to a "nominal avoidance" manoeuvre (also referred to as a "standard avoidance trajectory"), which can be followed if an alarm due to the monitoring of the aforesaid future trajectory is detected ("probe B" denoted TPB). Currently, the "nominal avoidance" manoeuvre is essentially in the vertical plane (after having straightened up the aircraft if it was turning).

Usually, the aeroplane is flying in a straight line. Hence it follows that any relief detected by the probe A is necessarily detected also by the probe B, since the two corresponding predicted trajectories are situated in the same vertical plane.

On the other hand, it is different from this when the aeroplane is turning. The respective axes of these two trajectories may lie respectively in two shifted vertical planes which between them make a horizontal angle which depends on the instantaneous turning radius.

In this case, and according to a quite significant aspect of the invention, Applicants envisage acting as follows: the strong alarms (visual warning light and spoken message "caution", but no display) generated by the detection of conflict between the standard avoidance trajectory and the relief can be disabled, from such time as no conflict is detected on the future trajectory of the aeroplane and/or on the avoidance trajectory TPA which may be initiated during this future trajectory.

This makes it possible to ensure proper performance of the system, by avoiding an untimely alarm while the pilot has already initiated an appropriate manoeuvre for avoiding collision with the terrain, an often tricky manoeuvre, during which it is inadvisable, even detrimental, to divert his attention.

Generally, the aforesaid probes are portions or sectors of surfaces delimiting a protection volume in front of the aeroplane, against the risks of collision with the terrain. The vertical shape of these probes is described in previous patents in the name of Applicants' assignees, especially U.S. Pat. No. 5,488,563 and U.S. application Ser. No. 09/343, 288.

Figure 9:
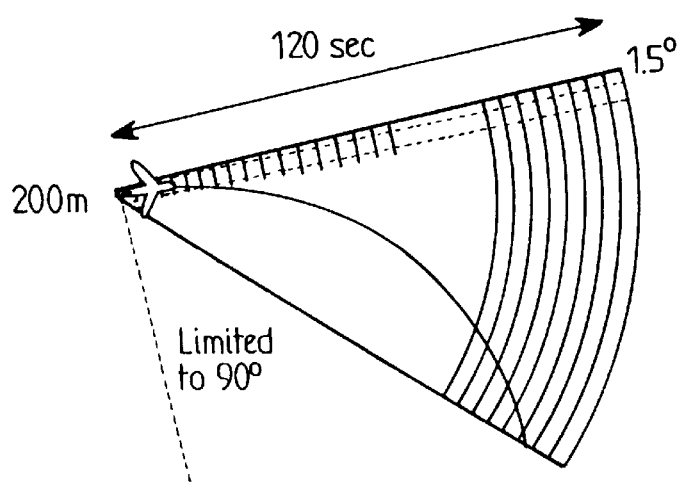
FIG. 9 illustrates diagrammatically a curved trajectory line projected into a plane.

The projection onto a horizontal plane of this volume consists (FIG. 9) of that part of a sector situated ahead of the aeroplane. At its near end or "entrance" (at the position of the aeroplane), this sector is of a selectable (for example 200 m) or more generally variable width, as a function in particular of the estimated lateral error in the position of the aeroplane. Laterally, this sector is open angularly as a function of one at least of the following criteria:

on either side of the instantaneous trajectory of the aeroplane for the robe B ("alarm"), on either side of the predicted trajectory at the associated time (for example 20 seconds) for the probe A ("pre-alarm"), in each case by a specified angle (selectable value, for example 1.5°), which can be increased, especially in the case of turning, to a greater value on the turning side (at least) so as definitely to include the future trajectory, in a manner limited to a maximum aperture, for example to 90° (2*45°), or 120°, or 180°, or even up to 360° for certain aircraft such as helicopters.

As a variant (compatible with the foregoing), the projection onto a horizontal plane of this volume can consist routinely (FIGS. 3 and 4) of a domain centred about the predicted future trajectory. This can for example be a band which progressively broadens with time, having at the entrance—at the current position of the aeroplane—a selectable (for example 200 m) or variable width corresponding to the estimated lateral error in the position of the aeroplane, as already indicated.

The entrance/exit distance or depth of the sector can be defined as a function of the velocity of the aeroplane, or of other criteria, which may or may not be related to this velocity. It can also be fixed.

The latter projection is well-suited to the future trajectory of the aeroplane, whilst the first is preferably applicable to the standard avoidance trajectory.

It is important to stress that the alarm generation is based, at least in part, on a future trajectory prediction, rather than being based routinely on the direction of the instantaneous axis of the aeroplane.

The display of the risks of collision with the terrain will now be considered. This display is important since the pilot must be supplied with a clear, albeit complex, message.

Generally, the proposed system presents on a screen, as a function of the current position of the aeroplane, information on the risks of conflict with the terrain, so as to provide the pilot(s) with a view of the surrounding situation ("situation awareness"). This information comprises, simultaneously or otherwise, and as one or more images, (FIGS. 8A to 8D):

an image background representing in the form of an intersection contour CI the significant reliefs which are liable to present a danger to the aeroplane, given its position and its current trajectory (and, implicitly, chosen criteria relating to its manoeuvring capabilities);

visual information CPA (pre-alarm contour) and CA (alarm contour) on the geographical zones in which alarms relating to the terrain ("pre-alarms" and "alarms") may potentially be generated;

information INF relating, for example, to the location of towns or airport zones;

information representing the zones of conflict with the terrain, which are dangerous for the aeroplane ("pre-alarms" and "alarms", according to the alarm generated), and the overstepping of which becomes a limitation or even impossible.

Figure 7A:
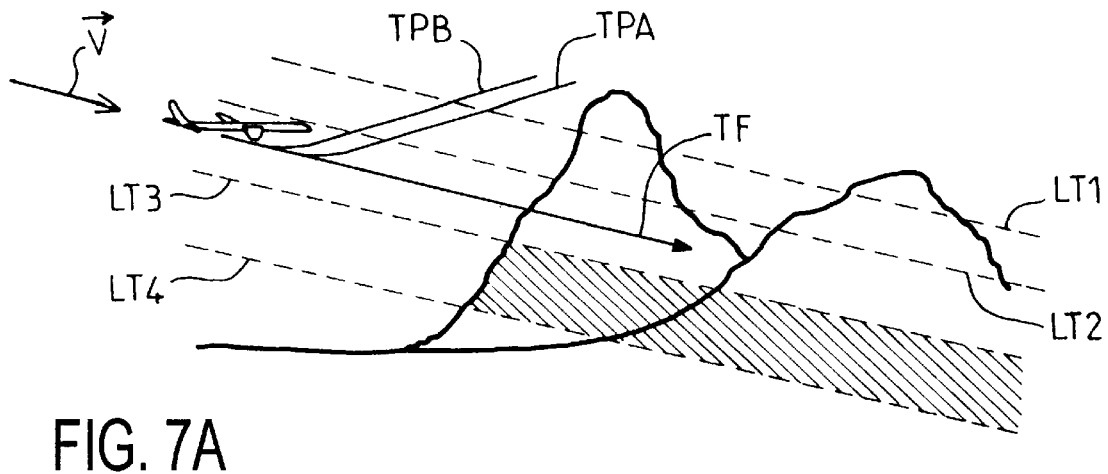
FIGS. 7A and 7B illustrate in two situations the basics of the second embodiment of the invention.
Figure 7B:
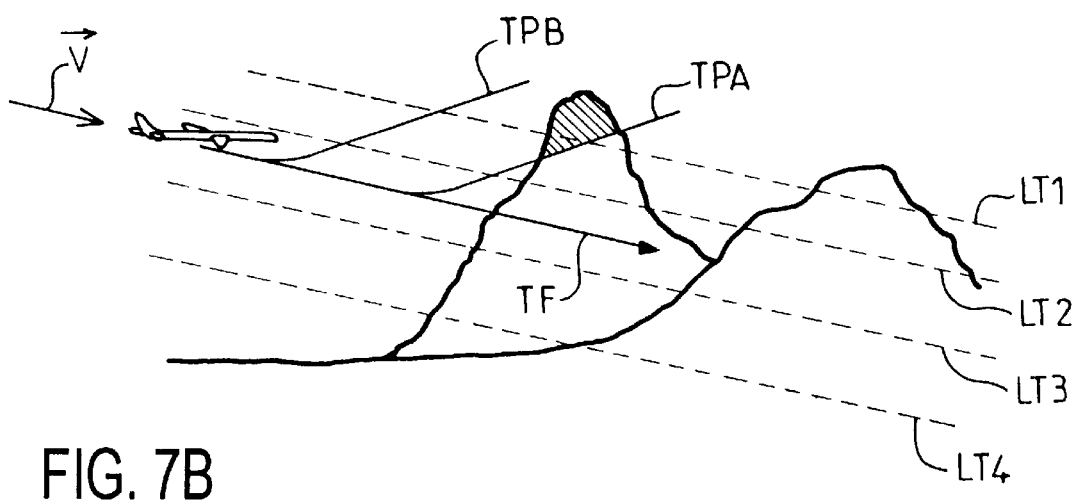

FIGS. 7A and 7B relate to the case of a descending aircraft, V being its velocity vector. TF is its estimated future trajectory, without manoeuvre. TPA is the future trajectory of the probe "A" (pre-alarm). TPB is the future trajectory of the probe "B" (alarm), this being in principle the standard vertical avoidance trajectory. The rows of slanting dashes are trajectory lines LT1 to LT4 belonging to sheets extending over the scan sector ahead of the aircraft. Here the sheets, and consequently the trajectory lines, are parallels which are equidistant with respect to the future trajectory TF. It will be noted that these are not actual trajectories of the aeroplane. FIG. 7B is distinguished by a risk regarding the feeler TPA on account of the fact that it intersects the relief.

Transversely, the following procedure is carried out:

a) the processing means 4, and more particularly their scanning module 400 (see FIG. 2), are configured, firstly, to calculate auxiliary vectors (or auxiliary velocity vectors) by shifting the (instantaneous) velocity vector of the aircraft according to a chosen angular scanning law, b) then, they define a(n) (angular) sector with the aid of a sheet of trajectory lines starting from the velocity vector and from the auxiliary vectors.

Operations a) and b) above are conducted for each of the levels (or sheets) of trajectory lines which are illustrated in FIGS. 7A and 7B, and which remain limited to the vertical plane. Hence, this serves equally well to determine the portions of intersection contour CI forming the image background as to determine the portions of alert contour CPA and CA which are obtained on the basis of the avoidance trajectories.

Furthermore, when the aeroplane is turning and/or manoeuvring vertically, the acceleration is preferably taken into account. Thus, each sector is a curved surface generated by a family of curved lines delimiting the sheet. For example, if the aeroplane is descending vertically, the angular scanning (chosen angular scanning law), of the auxiliary velocity vectors generates substantially a sector of a conical surface. Preferably, this law consists in varying the angle $\phi$ of the instantaneous velocity vector in the horizontal plane while keeping these other two spherical coordinates constant.

The sector containing the trajectory TF of FIGS. 7A and 7B is referred to as the "flight sector". The representation of the map background corresponds in every point to the future actual situation of the aeroplane: regardless of the hypothetical future position of the aeroplane on one of the future trajectories lying in this flight sector, the representation of the relief is referred directly to this future position, that is to say in terms of height with respect to the aeroplane. This operation is performed by the comparison module 401 as far as the determination of the contour is concerned and by the module 402 as far as the marking of the various zones separated by distinct portions of contours is concerned.

Thus, the pilot has available an intersection contour CI (or map), which represents the relief in the direction of the velocity vector of the aircraft, and over a chosen angular sector. The number of superimposed levels of the relief displayed will depend on the number of sheets used to intersect the relief.

For the rest, the image background and the other information are generated from the terrain database, for example in the manner described in U.S. Pat. No. 5,488,563, U.S. application Ser. No. 09/343,288 or other similar proposals published since.

The risks of conflict with the terrain (but not the representation of the terrain itself) may be presented on a separate particular screen. It is currently regarded as preferable to use a navigation screen or one for displaying the weather map 55, normally in existence in the aircraft.

The risks of conflict are transmitted to the screen by way of a bus linking the GCAS system to this screen. This bus will preferably be a video- or digital-type bus, normally used on aeroplanes, such as Arinc 646 (Ethernet), Arinc 629 or Arinc 453.

The risks of conflict can be presented in various ways:

in a manner exclusive of the other displays which conventionally appear on the screen adopted (preferably the screen for displaying the weather map). In this case, a facility for selecting the display may be necessary;

alternatively, in combination with these other displays, for example horizontal representation of the course followed, simultaneously with the risks of collision with the terrain and possibly with in addition the information INF relating to traffic (for example other surrounding aeroplanes) or the location of airport zones.

Stated otherwise, the display may be alternated, for example the weather map being displayed alternately with the risk-of-collision map (contour). Moreover, provision may be made for the collision map to be displayed routinely and in a priority manner as soon as an alarm is issued. It is also possible to envisage displaying the weather map and risk-of-collision map at the same time, possibly as well as other useful INF information.

The corresponding data to be displayed are converted according to the coding specific to the bus adopted.

The visual representation of the image background will now be examined. This background is preferably displayed according to the aeroplane heading.

The image background represents the height of the reliefs relative to the estimated altitude which the aeroplane will have at each of the relevant points, given its position and its current trajectory (FIGS. 7A and 7B). This estimation can be performed for example according to radials from its current position according to the current slope of its trajectory or according to curves representative of the turn to be performed in order to reach each of these points (see FIGS. 9 and 11).

Such a presentation makes it possible to show the potential risks of collision with the relief of the terrain, and to do so having regard to the current trajectory TF of the aeroplane. Thus, only the actual risks are displayed and appear for a given slope (whether this be a descent or a climb) via the opposite end of the display from the aircraft, allowing real anticipation of these risks. This display is preferably performed by "projecting" the contour onto a horizontal plane.

This relative height is represented by symbols of different colour and/or variable density and/or with different symbols (for example in the form of + and/or ^ and/or ~ and/or a triangle) depending on the slices of this relative height. A yellow or amber tint is preferably chosen in respect of relative heights which are such that the terrain is above the aeroplane and above a below-the-aeroplane margin. The terrain situated below a certain threshold (greater than the abovementioned margin, for example 1500 ft) might not be displayed.

The image background is generated preferably on either side of the aeroplane heading with an aperture defined by a lateral distance or by an angular aperture. Forward of the aircraft, it extends over a distance (scale) which makes maximum use of the display capabilities of the screen. A more restricted scanned zone is nevertheless temporarily or permanently conceivable.

The alarm generation zones represent the geographical zones from which a pre-alarm ("caution") and/or an alarm ("alarm") may be generated as soon as the aeroplane enters this zone, given its current position and current trajectory. The way in which the probes A and B can be defined at the same time will now be seen.

The limit of these zones is generated by scanning on either side in front of the aeroplane with a selectable aperture (for example ±45°, but a smaller or larger expanse may be envisaged) a straight or curved line representative for example of a radial or a turn starting from the current position of the aeroplane and according to the current slope of its trajectory (derived from the velocity vector), and by advancing a standard avoidance trajectory (or evasive trajectory; such as for example that described in a previous patent on GCAS) along this line up to a point at which this standard avoidance trajectory meets the terrain or relief, possibly with a margin, fixed or otherwise. To accelerate the calculations, this margin can be applied a priori to the altitude of the terrain, or to the trajectory, or else to the aircraft. The point RP illustrated in FIG. 10 represents the start of the avoidance manoeuvre.

Figure 10:
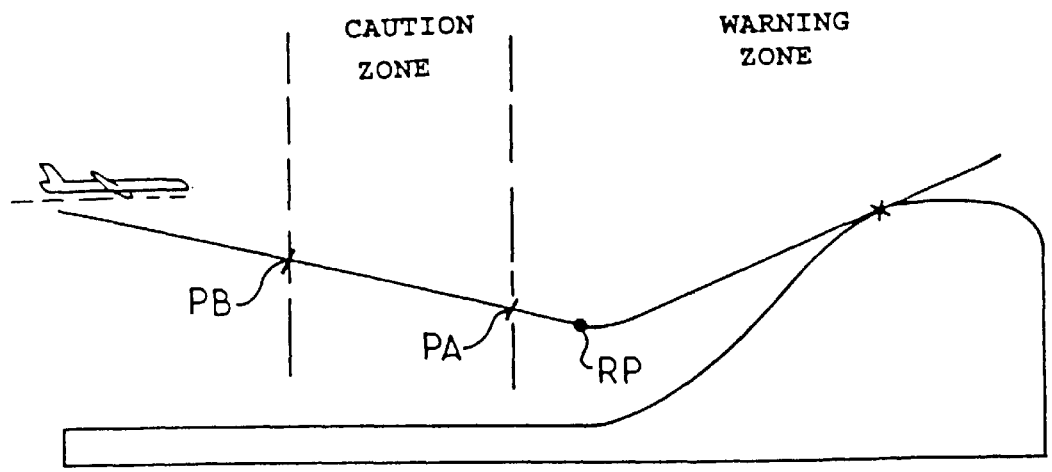
FIG. 10 illustrates the manner of generating the displays of FIG. 8.

Two points PA and PB situated on this line, ahead of the point RP calculated above, determine the upstream limits of the pre-alarm (point PA) and alarm (PB) zones, respectively (FIG. 10). These points are preferably defined in accordance with 2 anticipation times (for example 5 seconds and 20 seconds); they could also be defined in terms of distance, or in some other equivalent manner, at least in certain cases. They represent the time theoretically available to the aircraft to travel the distance which separates the relevant point (PA or PB) from the point RP representing the start of the manoeuvre. The time gap between the points PA and PB is currently chosen to be equal to about 15 seconds, but it could be envisaged to be smaller or larger.

By applying the angular scan to the trajectory lines of a sheet, an upstream portion of alert contour is thus obtained, that is to say one which is close to the aeroplane. It remains to terminate it via a downstream portion up to the limits of the display (displayed sector).

This could be done as for the representing of the reliefs of the map background. It is currently deemed preferable to proceed otherwise: two adjacent lines are considered; when a point RP is determined on one of these two lines, but not on the other, the remainder of the contour PRO can be extended downstream as far as the display limits via one or other of these two adjacent lines (or via both), in a pre-defined manner.

It is advisable to give these contours and/or the zones which they delimit a distinctive representation. This distinctive character can be obtained, with the aid of a marking module 402, by markings such as dashes (as in FIGS. 8A to 8D) or symbols of different colours or different shades (for example shades of grey) and/or of variable density and/or with different symbols for the pre-alarm zone and the alarm zone. A yellow or amber tint is regarded as preferable to differentiate the pre-alarm zone and a red tint is regarded as preferable to differentiate the alarm zone.

The zones of conflict with the terrain are presented (or displayed) when the aeroplane enters an alarm generation zone. In this case the set of points of the relief overstepping the standard avoidance trajectory associated with the zone penetrated (pre-alarm or alarm, delimited by an alert contour CPA or CA) possibly with a fixed or non-fixed margin are represented preferably in full colour as illustrated in FIG. 7B. A yellow or amber tint is preferably chosen for the reliefs which penetrate the standard avoidance trajectory associated with a pre-alarm and a red tint for the reliefs which penetrate the standard avoidance trajectory associated with an alarm.

The sector situated behind these relief points may possibly furthermore be coloured in the same manner, or according to a matching colour.

The system considers points of an estimated future trajectory of the aeroplane, or of a shifted replica of such a future trajectory. It compares the altitude (the so-called "aeroplane altitude") with the vertical for this point, and the assumed elevation of the terrain at this point, which is derived from a database. In order to ensure proper operation when the aeroplane is near to the ground, it is important for this difference to be as close as possible to reality.

Preferably, the aeroplane altitude used (at least for the alarm generation algorithms, but preferably also for representing the terrain) is consolidated by an actual height obtained via a means such as the radio altimeter. The following procedure is followed:

Above a high threshold H1 (adjustable) of the measurement of the radio altimeter (for example 1500 ft), the altitude which is used by the alarm generation algorithms, and which is compared with the terrain elevation emanating from a database, is derived essentially from the navigation means on board the aeroplane, for example from a GPS radionavigation receiver and/or from an inertial or baro-inertial IRS system.

Below a low threshold H2 (adjustable) of the measurement of the radio altimeter (for example 500 ft or 1000 ft), the altitude which is used by the alarm generation algorithms, and which is compared with the terrain elevation emanating from a database, is derived from the value delivered by the radio altimeter plus the elevation extracted from the terrain database (representing the relief).

Between these 2 threshold values H1 and H2, the altitude which is used by the alarm generation algorithms, and which is compared with the terrain elevation emanating from the database, is obtained via a combination between the altitude obtained from the navigation means aboard the aeroplane and the radio altimeter, for example a linear interpolation between these 2 values, such as given by the following formula:

$$\text{Prediction\_altitude} = x*\text{sensors\_altitude} + y\,(\text{radio altitude} + \text{terrain\_elevation})$$

with $x = (\text{radio altitude} - H2)/(H1 - H2)$ and $y = 1 - x$

Through this altitude consolidation, the vertical errors in the aeroplane position and/or in the elevations delivered by the terrain database, as well as the horizontal errors in the aeroplane position are then compensated for, and make it possible for the algorithms actually to take into account threats due to the terrain despite these errors.

Moreover, it may happen that the aeroplane is confronted by reliefs which a "nominal avoidance" manoeuvre will be unable to circumvent: the avoidance of such obstacles requires not only a vertical avoidance manoeuvre, but also an avoidance manoeuvre to one side of the aeroplane (or turn).

The Applicants advocate that a special alarm be generated in such a situation. The special alarm consists of a specific indication which is supplied to the pilot in oral and/or visual form (for example "Avoid Terrain" as a spoken message and/or as text on a screen and/or by switching on an indicator light, coloured red for example).

Generally, the special alarm is issued when terrain (in a significant portion) begins to overtake the probe upwards, at the distant end of the probe and/or to the sides thereof, or else after a period of disabling the algorithms for generating the alarms.

In a particular example, the following cases give rise to the generating of this so-called special alarm indication:

- terrain higher than the probe at its end, so that it is then not possible to avoid this terrain via a straightforward vertical manoeuvre,
- terrain higher than the probe entering at the side during a turn and that the aeroplane levelling-off time does not allow this terrain to be avoided,
- terrain overtaking the probe by a height greater than a selectable vertical threshold (for example 500 ft),
- terrain overtaking the probe without however exceeding the previous vertical threshold over a horizontal lateral distance greater than a selectable value (for example 2000 m).

Other elements relating to an alarm of the "Avoid terrain" type will be found in EP-A-0 802 469.

The system thus defined possesses all or some of the following properties:

- it comprises means for generating, orally and/or visually, an indication in the event of a situation which cannot be circumvented by a pull-up manoeuvre,
- it comprises means for detecting the risks not only on the future trajectory of the aeroplane but also on the nominal avoidance trajectory,
- it comprises means for generating alarms with the terrain which take account not only of the future trajectory of the aeroplane but also of the nominal avoidance trajectory,
- it comprises one or more probes which open out to the sides as a function of the rate of turn and/or the roll in such a way as to monitor the future trajectory of the aeroplane,
- it comprises one or more probes oriented according to the predicted course of the aircraft and/or the predicted trajectory and/or the predicted heading,
- it comprises one or more probes consisting of a surface or domain surrounding the predicted trajectory,
- it comprises display means for presenting a terrain background consisting of relative heights of the terrain with predicted elevations of the aeroplane,
- it comprises display means for presenting the predicted zones for generating alarms relating to the terrain,
- it comprises display means for presenting the zones in which a risk of conflict with the terrain is detected on the future and/or standard avoidance predicted trajectory,
- it comprises means for consolidating the altitude which is used by the logic for detecting the risks of collision, in particular by combination with a radio altitude value.

Of course, the processing module 4 according to the invention advantageously comprises a synchronization module 403 which controls the scanning 400 and display 55 modules in such a way as to ensure the periodic renewal of the display on the basis of updated measurements.

Moreover, all the thresholds and values given hereinabove are so by way of example. Their respective choices are based on current preferences related to the capabilities of aircraft and pilots. Consequently, these thresholds and values may be chosen to be different from those indicated, provided that they remain within the intervals stated in the claims hereinbelow and in the introductory part of the present document.

Thus:

- the substantially parallel parts of the sheets are preferably spaced apart vertically by a distance of between about 50 feet and about 3000 feet, in particular between 100 feet and 700 feet. Likewise, the substantially parallel parts of the sheets are spaced apart from one another by a time interval of between about 5 seconds and about 60 seconds, in particular 15 seconds;
- the angular scan extends over between about 1° and about 360°, in particular between 60° and 120°;
- the processing means are configured so as to effect each intersection with the relief over a range corresponding to a time of travel of the aircraft at least equal to about 30 seconds, in particular 120 seconds;
- the display means are configured so as to allow the displaying of the contour, in at least the direction of the velocity vector of the aircraft, over an extent of between about 5 nautical miles and about 400 nautical miles;
- the chosen criterion for the issuing of a visual and/or audible alarm, pertaining to the vertical distance separating a representation of the intersection between the relief and the evasive trajectory and the apex of the relief placed substantially square with the intersection between the relief and the relevant evasive trajectory, is a comparison between the vertical distance and a vertical threshold of between about zero (0) feet and about 800 feet (preferably equal to about 500 feet), the alarm being triggered when this vertical distance is greater than the vertical threshold;
- as a variant, this chosen criterion for the issuing of a visual and/or audible alarm, pertaining to the vertical distance separating a representation of the intersection between the relief and the evasive trajectory and the apex of the relief placed substantially square with the intersection between the relief and the relevant evasive trajectory, is a first comparison between the vertical distance and a vertical threshold of between about 100 feet and about 800 feet (preferably equal to about 500 feet), coupled with a second comparison between a chosen horizontal threshold and the horizontal distance over which the sheet, formed of the relevant evasive trajectory lines, intersects the relief, the alarm being triggered when the horizontal distance is greater than the chosen horizontal threshold and when at the same time the vertical distance remains less than the vertical threshold; and
- the chosen criterion for the issuing of a visual and/or audible alarm, in the event of intersection between, on the one hand, the relief and one at least of the first and second evasive trajectories, and on the other hand, the relief and at least the estimated future trajectory, is a first comparison between a vertical threshold of between about zero (0) feet and about 800 feet and the vertical distance separating the apex of the relief substantially square with a point which is a chosen horizontal distance away from the intersection between the relief and the evasive trajectory, coupled with a second comparison between a threshold duration and the duration required for the aircraft to be levelled off, the alarm being triggered when the vertical distance is greater than the chosen vertical threshold and when at the same time the levelling-off duration is greater than the threshold duration, the threshold duration preferably being between about 10 seconds and about 150 seconds, in particular between 60 seconds and 120 seconds.

We claim:

1. A process for aiding the aerial navigation of an aircraft, comprising the following steps:
   a) receiving, on board the aircraft, status indications representing its position and its velocity vector,
   b) storing in a work memory a three-dimensional representation of the relief of the terrain region overflown by the aircraft,
   c) defining, as a function of the said status indications, an exploration sector referred to the aircraft, and calculating in this sector a contour as a function of the intersection of this sector with the relief, and
   d) displaying said contour, characterized in that step c) comprises the following sub-steps:
      c1) calculating auxiliary velocity vectors by shifting the velocity vector of the aircraft according to a chosen law of angular scanning, and
      c2) defining said exploration sector by a sheet of trajectory lines starting from said velocity vector and from said auxiliary velocity vectors.

2. A device for aiding aerial navigation of an aircraft, comprising:
   an input for receiving status indications representative of the position and of the velocity vector of an aircraft,
   a work memory for storing a three-dimensional representation of the relief of a terrain region overflown by the aircraft,
   processing means able to define, as a function of the said status indications, an exploration sector referred to the aircraft, and to calculate in this sector a contour as a function of the intersection of this sector with the relief, and
   means for displaying this contour, characterized in that the processing means are configured so as to calculate auxiliary velocity vectors by shifting the velocity vector of the aircraft according to a chosen angular scanning law, and so as to define said sector by a sheet of trajectory lines starting from the velocity vector and from the auxiliary velocity vectors.

3. A device according to claim 2, characterized in that each intersection is limited to an upstream part, each contour then consisting of said upstream part and of a downstream extension determined according to a chosen rule.

4. A device according to claim 2, characterized in that the display means are configured so as to allow the displaying of the contour, in at least the direction of the velocity vector of the aircraft, over an extent of from about 5 nautical miles to about 400 nautical miles.

5. A device according to claim 2, characterized in that the processing means are configured so as to control the simultaneous displaying of the contour and of a weather map.

6. A device according to claim 2, characterized in that it comprises a mass memory for storing a database representing at least a part of the terrestrial globe, and management means able to extract from the database the three-dimensional representations of the relief as a function of the aircraft's position parameters.

7. A device according to claim 2, characterized in that the processing means are configured so as to effect each intersection with the relief over a range corresponding to a time of travel of the aircraft at least equal to about 30 seconds.

8. A device according to claim 7, characterized in that said time of travel is about 120 seconds.

9. A device according to claim 2, characterized in that the processing means are configured so as to control the alternate displaying of the contour and of a weather map.

10. A device according to claim 9, characterized in that the processing means are configured so as, in the event of intersection between the relief and at least the sheet formed of second evasive trajectory lines, to determine whether the estimated trajectory also intersects the said relief, and to authorize the issuing of an alarm only when this intersection is determined.

11. A device according to claim 2, characterized in that the processing means are configured so as to control the displaying of complementary information.

12. A device according to claim 11, characterized in that said complementary information is airport location information.

13. A device according to claim 2, characterized in that said input is configured so as to receive status indications, and in particular an actual altitude and a relative altitude referenced with respect to the overflown terrain, and in that the processing means are configured so as to determine the estimated trajectories and avoidance trajectories on the basis of an altitude chosen from among said actual and relative altitudes and a composite altitude as a function of a comparison with two predetermined altitude thresholds, said chosen altitude being one of:
   the actual altitude when the said actual altitude is less than the two thresholds, and
   the relative altitude when the said actual altitude is greater than the two thresholds, and
   the composite altitude when the said actual altitude lies between the two thresholds.

14. A device according to claim 13, characterized in that the composite altitude is formed from a weighted combination of said relative and actual altitudes.

15. A device according to claim 2, characterized in that the processing means are configured so as to define, as a function of the said status indications and of the relief, a domain encompassing each trajectory line constituting a sheet, and to determine the intersection between each sheet and the relief on the basis of the intersections of the domains of each of its trajectory lines with said relief.

16. A device according to claim 15, characterized in that the point of intersection of a said trajectory line contributing to the formation of the contour is obtained by taking that point of intersection, from among all the points of intersection between the domain of this trajectory line and the relief, which possesses the highest altitude.

17. A device according to claim 2, characterized in that the angular scan extends over an interval of from about 1° to 360°.

18. A device according to claim 17, characterized in that said interval is from 60° to 120°.

19. A device according to claim 2, characterized in that the trajectory lines are first estimated evasive trajectory lines, at piloting control inputs modified according to a first chosen evasive law, starting from said velocity vector and from said auxiliary velocity vectors.

20. A device according to claim 19, characterized in that the first evasive law comprises an extension of a representation of the current trajectory established as a function of a chosen criterion, followed by a manoeuvre having a vertical component.

21. A device according to claim 20, characterized in that the processing means are configured so as to calculate a first alert contour as a function of the start point of each manoeuvre at each first estimated evasive trajectory line of said sheet, when at least one of said first estimated evasive trajectories intersects the relief.

22. A device according to claim 19, characterized in that the processing means are configured so as to trigger a chosen audible or visual pre-alarm in the event of intersection between a sheet formed of said first evasive trajectory lines.

23. A device according to claim 22, characterized in that the processing means are configured so as to force the displaying of the contour in the event of the issuing of a pre-alarm.

24. A device according to claim 2, characterized in that the processing means comprise differentiation means able to allocate different markings to the zones situated on either side of each contour, said markings being chosen as a function of a predetermined criterion pertaining to a risk of collision between the aircraft and the relief.

25. A device according to claim 24, characterized in that the predetermined criterion is a law pertaining to the distance separating each point of the contour from the point representative of the relief situated vertically plumb with the said contour point, the said different markings corresponding to different, predetermined distance intervals representative of associated risks of collision.

26. A device according to claim 25, characterized in that the various markings are shades of grey or different frames.

27. A device according to claim 25, characterized in that each marking consists of a coloration.

28. A device according to claim 27, characterized in that the various colours are chosen from among a family of standards comprising at least one of: European Standard JAR 25-1322 and American standard FAR 25-1322, and in that the coldest colour corresponds to the smallest risk of collision.

29. A device according to claims 2, characterized in that the trajectory lines are second estimated evasive trajectory lines, at piloting control inputs modified according to a second chosen evasive law, starting from said velocity vector and from said auxiliary velocity vectors.

30. A device according to claim 29, characterized in that the second evasive law comprises an extension of a representation of the current trajectory established as a function of a chosen criterion, followed by a manoeuvre having a vertical component.

31. A device according to claim 30, characterized in that the processing means are configured so as to calculate a second alert contour as a function of the start point of each manoeuvre at each said second estimated evasive trajectory line of the said sheet, when at least one of said second estimated evasive trajectories intersects the relief.

32. A device according to claim 29, characterized in that the processing means are configured so as to trigger a chosen audible or visual alarm in the event of intersection between a sheet formed of said second evasive trajectory lines.

33. A device according to claim 32, characterized in that the processing means are configured so as to control the displaying of the contour and of a weather map; and in that the processing means are configured so as to force the displaying of the contour in the event of the issuing of an alarm.

34. A device according to claim 2, characterized in that the trajectory lines all have the same geometry.

35. A device according to claim 34, characterized in that the trajectory lines are replicas of an estimated trajectory of the aircraft, at unchanged piloting control inputs, so that the contour of intersection takes account of the current flight conditions of the aircraft.

36. A device according to claim 35, characterized in that the processing means are configured so as to define several sheets of trajectory lines having different vertical shifts.

37. A device according to claim 36, characterized in that said sheets are spaced apart at the outset in a substantially regular manner.

38. A device according to claim 36, characterized in that the said sheets are at least partially substantially parallel to one another.

39. A device according to claim 6, characterized in that the substantially parallel parts of the said sheets are spaced apart vertically by a distance of from about 50 feet to about 3000 feet.

40. A device according to claim 39, characterized in that said distance is from 100 feet 700 feet.

41. A device according to claim 38, characterized in that some of the trajectory lines are first estimated evasive trajectory lines, at piloting control inputs modified according to a first chosen evasive law, starting from said velocity vector and from said auxiliary velocity vectors; in that others of the trajectory lines are second estimated evasive trajectory lines, at piloting control inputs modified according to a second chosen evasive law, starting from said velocity vector and from said auxiliary velocity vectors; and in that the sheets formed of the first and second evasive trajectory lines are at least partially substantially parallel to one another.

42. A device according to claim 41, characterized in that the substantially parallel parts of the said sheets are spaced apart from one another by a time interval of from about 5 seconds to about 60 seconds.

43. A device according to claim 42, characterized in that said time interval is about 15 seconds.

44. A device according to claim 1, characterized in that some of the trajectory lines are first estimated evasive trajectory lines, at piloting control inputs modified according to a first chosen evasive law, starting from said velocity vector and from said auxiliary velocity vectors; in that others of the trajectory lines are second estimated evasive trajectory lines, at piloting control inputs modified according to a second chosen evasive law, starting from said velocity vector and from said auxiliary velocity vectors; and in that the processing means are configured so as to issue another visual and/or audible alarm, in the event of intersection satisfying a chosen criterion between, on the one hand, the relief and at least one of said first and second evasive trajectories, and on the other hand, the relief and at least the estimated future trajectory.

45. A device according to claim 44, characterized in that said chosen criterion is a first comparison between a vertical threshold of between about zero (0) feet and about 800 feet and the vertical distance separating the apex of the relief substantially square with a point which is a chosen horizontal distance away from the intersection between the said relief and the evasive trajectory, coupled with a second comparison between a threshold duration and the duration required for the aircraft to be levelled off, said alarm being triggered when said vertical distance is greater than said chosen vertical threshold and when at the same time the levelling-off duration is greater than said threshold duration.

46. A device according to claim 45, characterized in that the said threshold duration is from about 10 seconds to about 150 seconds.

47. A device according to claim 46 characterized in that said threshold duration is from about 60 seconds to about 120 seconds.

48. A device according to claim 44, characterized in that said chosen criterion pertains at least to the vertical distance separating a representation of the intersection between the relief and the evasive trajectory and the apex of the relief placed substantially square with the intersection between said relief and the relevant evasive trajectory.

49. A device according to claim 48, characterized in that said chosen criterion is a first comparison between the said vertical distance and a vertical threshold of between about 100 feet and about 800 feet, coupled with a second comparison between a chosen horizontal threshold and the horizontal distance over which the sheet formed of the relevant evasive trajectory lines intersects the relief, said alarm being triggered when said horizontal distance is greater than said chosen horizontal threshold and when at the same time the vertical distance remains less than said vertical threshold.

50. A device according to claim 48, characterized in that said chosen criterion is a comparison between the said vertical distance and a vertical threshold of between about zero (0) feet and about 800 feet, the said alarm being triggered when this vertical distance is greater than the said vertical threshold.

51. A device according to claim 50, characterized in that said vertical threshold is equal to about 500 feet.

\* \* \* \* \*